United States Patent
Kawamoto

(10) Patent No.: US 6,945,716 B2
(45) Date of Patent: Sep. 20, 2005

(54) PRINTER

(75) Inventor: Yusaku Kawamoto, Daito (JP)

(73) Assignee: Funai Electric Co., Ltd., Daito (JP)

( * ) Notice: Subject to any disclaimer, the term of this patent is extended or adjusted under 35 U.S.C. 154(b) by 0 days.

(21) Appl. No.: 10/892,221

(22) Filed: Jul. 16, 2004

(65) Prior Publication Data

US 2005/0013642 A1 Jan. 20, 2005

(30) Foreign Application Priority Data

Jul. 17, 2003 (JP) ........................................ 2003-275763

(51) Int. Cl.$^7$ ............................................ B41J 11/44
(52) U.S. Cl. .............................. 400/62; 400/61; 400/70; 400/76
(58) Field of Search .............................. 400/76, 70, 61, 400/62

(56) References Cited

U.S. PATENT DOCUMENTS

| | | | | |
|---|---|---|---|---|
| 5,706,097 A | * | 1/1998 | Schelling et al. | 358/296 |
| 6,154,755 A | * | 11/2000 | Dellert et al. | 715/526 |
| 6,469,770 B2 | * | 10/2002 | Hoshino et al. | 355/40 |
| 2001/0048447 A1 | * | 12/2001 | Jogo | 345/620 |
| 2002/0054279 A1 | * | 5/2002 | Hoshino et al. | 355/40 |
| 2002/0196289 A1 | * | 12/2002 | Sakamoto et al. | 345/838 |
| 2003/0025936 A1 | * | 2/2003 | Ouchi et al. | 358/1.15 |

FOREIGN PATENT DOCUMENTS

| | | | |
|---|---|---|---|
| JP | 08-029881 | 2/1996 | |
| JP | 2001-333270 | 11/2001 | |
| JP | 2005035201 A | * 2/2005 | B41J/5/30 |

OTHER PUBLICATIONS

Computer Translation of JP 08–029881.*
Computer Translation of JP 2001–333270.*

* cited by examiner

Primary Examiner—Charles H. Nolan, Jr.
(74) Attorney, Agent, or Firm—Crowell & Moring LLP

(57) ABSTRACT

A printer having a function for printing index prints comprises a connector to which a recording medium can be connected, a data reader for reading image data from the recording medium through the connector, a memory for memorizing a plurality of kinds of templates, a controller for selecting the most suitable template corresponding to a number of thumbnail images to be printed as the index prints, and a printing mechanism for printing the index prints on paper sheets. The controller calculates a minimum number of the paper sheets necessary for printing the index prints corresponding to the numbers of the boxes of the templates and a number of thumbnail images to be printed as the index prints, and selects one template having the largest size of the boxes among the templates by which all the thumbnail images can be arranged on the minimum number of the paper sheets.

7 Claims, 5 Drawing Sheets

PRINTER

BACKGROUND OF THE INVENTION

1. Field of the Invention

The present invention relates to a printer having a function for printing one or more index prints on which a plurality of thumbnail images is arranged.

2. Description of the Related Art

A printer having a function for printing one or more index prints, in which a plurality of thumbnail images is arranged on one or more paper sheets, is conventionally put in practical use, for example shown in publication of Japanese patent application 2001-333270 or 8-29881. The index prints are generally used for confirming the images memorized in the same file or recorded on the same recording medium such as a memory card. For example, when a user takes a plurality of images by a digital still camera, the images memorized in the same file or in the same memory card are printed as one or more index prints. The user utilizes the index prints for confirming contents of the images, for deciding the images to be printed individually and for deciding printing frame sizes such as an E-frame or a panorama frame, and so on.

A typical printer memorizes a plurality of kinds of templates in which a number, a frame size and an arrangement of boxes are specified. When the user selects one template for printing the index prints, the printer prepares image data of thumbnail images having a frame size corresponding to the box size of the selected template. The printer further prepares an edited data on which the image data of the thumbnail images are applied to the positions of the boxes arranged corresponding to the selected template. Thus, the printer prints the index prints with using the edited data.

When all the thumbnail images to be printed cannot be printed on the same paper sheet, the thumbnail images are printed on a plurality of paper sheets. The frame size and the arrangement of the thumbnail images on each paper sheet are followed to printing format of the selected template.

Since the index prints are used for confirming the contents of the images, it is preferable that the paper sheets used for printing the index prints are as smaller as possible in economical respect. On the other hand, it is preferable that the paper sheets used for printing the index prints are as larger as possible in respect of confirming the contents of the images. Majority of the users, however, attaches weight to the economical efficiency than the respect of confirming the contents of the images. The user attaching weight to the economical efficiency may select a template having the largest number of the thumbnail images arranged on the same paper sheet so as to reduce the number of the index prints.

For example, it is assumed that the printer has two templates respectively having sixteen boxes and twenty-five boxes. When the number of the thumbnail images to be printed is equal to or smaller than sixteen, only one paper sheet is used for printing the index print in either template is selected. There is no preference which template is selected in commercial respect. Since the smaller the number of the boxes arranged on the paper sheet is, the larger the size of each box becomes. It is preferable to select the template having sixteen boxes in respect of confirming the contents of the images. A suitable template can exist corresponding to the number of the thumbnail images to be printed, by which the frame size of the thumbnail images can be enlarged.

Thus, it is more preferable to select the most suitable template by which the number of paper sheets becomes the smallest but the frame size of the thumbnail images becomes the largest for printing the index prints. It, however, is inconvenience to the user to judge and select the suitable template, and the operation of the conventional printer is intractable.

SUMMARY OF THE INVENTION

A purpose of the present invention is to provide a tractable printer by which the most suitable template can be selected automatically when one or more index prints are printed so that the number of paper sheets becomes the smallest but the frame size of the thumbnail images becomes the largest for printing the index prints.

A printer in accordance with an aspect of the present invention comprises: a template memory for memorizing a plurality of kinds of templates respectively specifying a number, a size and an arrangement of boxes on each paper sheet in which thumbnail images are printed; an image data receiver for receiving image data; a controller for selecting a template suitable for printing one or more index prints among the templates memorized in the template memory; and a printing mechanism for printing one or more index prints following a printing format specified in the selected template.

The controller calculates a minimum number of the paper sheets necessary for printing the index prints corresponding to the numbers of the boxes of the templates and a number of thumbnail images to be printed as the index prints, and selects one template having the largest size of the boxes among the templates by which all the thumbnail images can be arranged on the minimum number of the paper sheets.

By such a configuration, the printer automatically selects the most suitable template for printing one or more index prints corresponding to the number of the thumbnail images to be printed on the paper sheets, by which the number of the paper sheets necessary for printing the index prints can be made the smallest, but the size of the thumbnail images can be made the largest.

DETAILED DESCRIPTION OF THE EMBODIMENT

A printer in accordance with an embodiment of the present invention is described.

Figure 1:
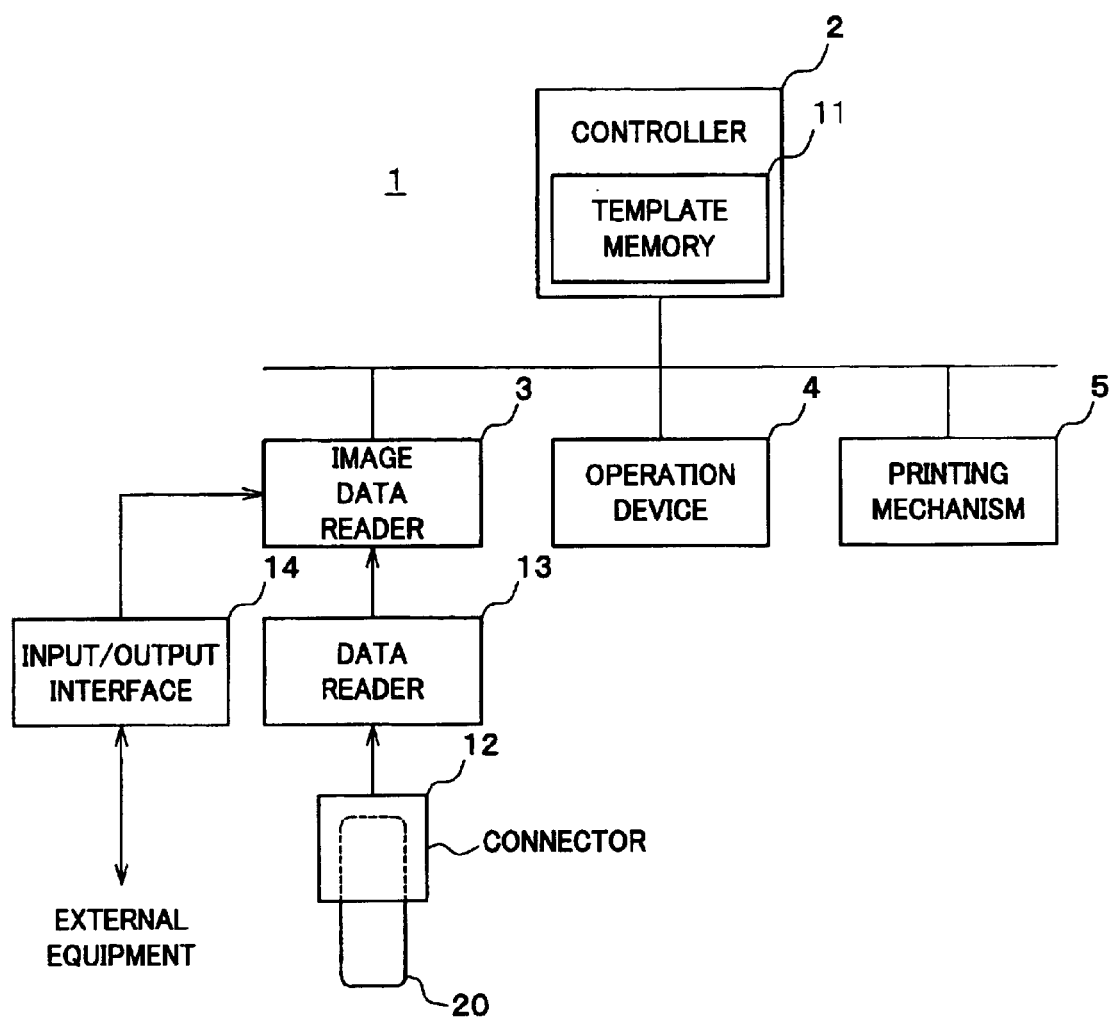
FIG. 1 is a block diagram showing a configuration of a printer in accordance with an embodiment of the present invention.
Figure 2A:
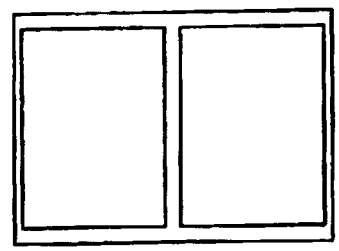
FIGS. 2A to 2E are drawings showing examples of templates memorized in the printer.
Figure 2B:
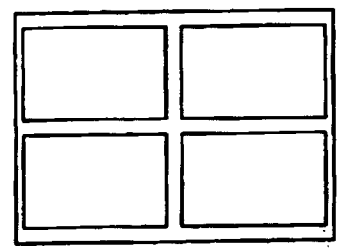
Figure 2C:
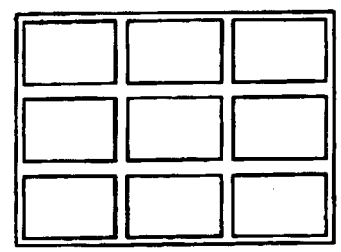
Figure 2D:
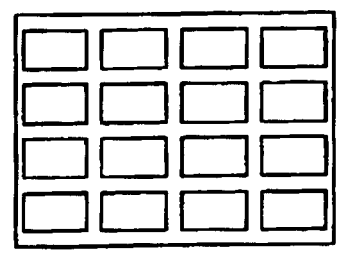
Figure 2E:
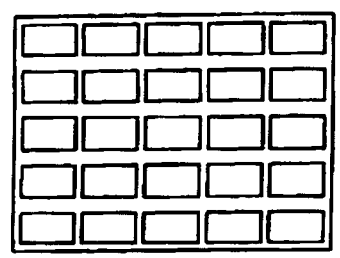

A configuration of the printer 1 in accordance with the embodiment is shown in FIG. 1. The printer 1 comprises a controller 2 for controlling the motion of the whole of the printer 1, an image data receiver 3 for receiving input of image data, an operation device 4 such as an operation device operated by a user for inputting an instruction to the printer 1, and a printing mechanism 5 for printing an image on a paper sheet. The controller 2 further comprises a template memory 11 such as a flash memory for memorizing a plurality of templates specifying printing format of one or more index prints. For example, five templates shown in FIGS. 2A to 2E are memorized in the template memory 11.

The printer 1 has a function for printing one or more index prints on one or more paper sheets respectively having a predetermined size, such as A5 sized paper sheets. The templates shown in FIGS. 2A to 2E respectively specify a number, size and an arrangement of boxes in which thumbnail images are printed. Specifically, the template shown in FIG. 2A has two boxes longitudinally longer. The template shown in FIG. 2B has four (2×2) boxes transversely longer. The template shown in FIG. 2C has nine (3×3) boxes transversely longer. The template shown in FIG. 2D has sixteen (4×4) boxes transversely longer. The template shown in FIG. 2E has twenty-five (5×5) boxes transversely longer. In FIGS. 2A to 2E, the an outer rectangular frame designates the size of the paper sheet on which the index print is formed, and a plurality of inner rectangular frames designates the size and positions of the boxes in which the thumbnail images are printed.

The printer 1 further comprises a connector 12 to which a recording medium 20 such as a memory card is connected, an data reader 13 connected to the connector 12 for reading out image data from the recording medium 20, and an input/output interface 14 for communicating data with an external equipment such as a personal computer or a digital still camera. The image data taken from the recording medium 20 is inputted to the image data receiver 3 from the data reader 13. Image data transmitted from the external equipment is inputted to the image data receiver 3 through the input/output interface 14.

The printing mechanism 5 forms a color image on a paper sheet. For forming the color image on the paper sheet, there are various systems, for example, an ink jet printing system for spraying a plurality of color inks on a normal paper sheet, a TA (Thermo-Autochrome) system for applying heat to a color heat-sensitive paper, and so on. Since the color image forming principles of there printing systems are known, details of them are omitted. The printing system of the printing mechanism 5 is not limited in these examples.

Figure 3:
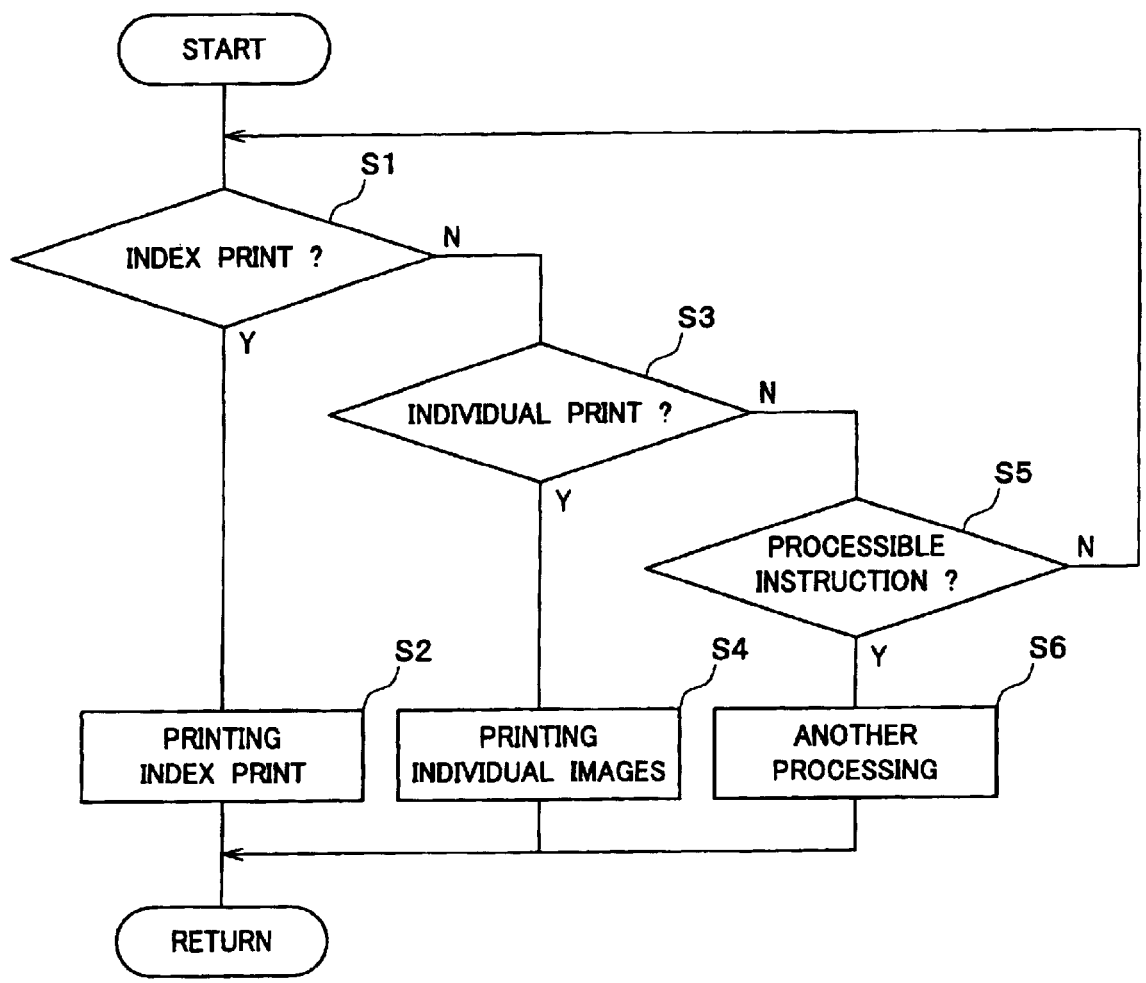
FIG. 3 is a flowchart showing a basic motion of the printer.

Subsequently, the motion of the printer 1 is described. FIG. 3 shows a basic motion of the printer 1. When an instruction is inputted from the operation device 4, the controller 2 judges whether the instruction is a request for printing the index print or not (S1). When the instruction is the request for printing the index print, the controller 2 executes a printing process of the index print (S2). Details of the printing process of the index print will be described later. When the instruction is not the request for printing the index print, the controller 2 further judges whether the instruction is a request for printing individual images or not (S3). When the instruction is the request for printing individual images, the controller 2 executes a process for printing the individual images respectively on individual paper sheets respectively having predetermined frame sizes such as an E-frame, a panorama frame, and so on (S4). When the instruction is not the request for printing individual images, the controller 2 further judges whether the instruction is a request processible or not (S5). When the instruction is processible, the controller 2 executes a process corresponding to the instruction (S6).

Figure 4:
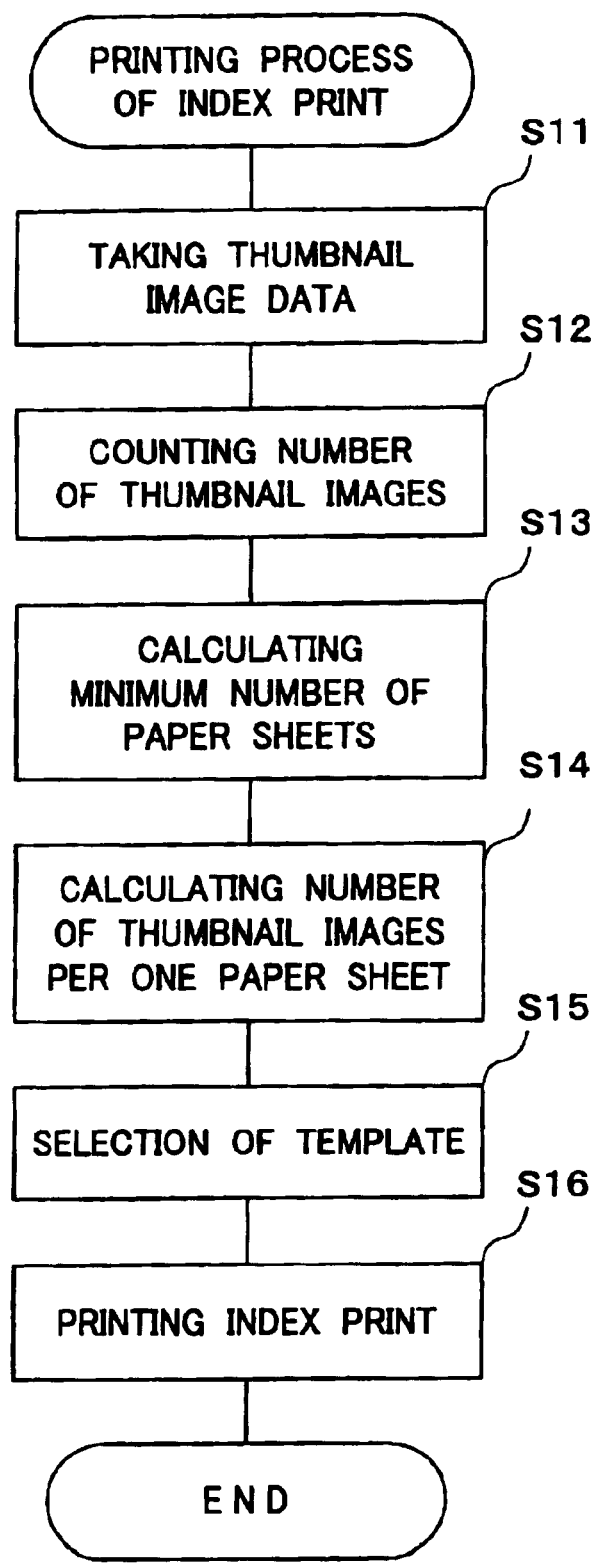
FIG. 4 is a flowchart showing a process for printing an index print in the printer.

Subsequently, the printing process of the index print in the step S2 is described with reference to a flowchart shown in FIG. 4. The instruction for printing the index print can be inputted by the following two ways into the printer 1. The instruction for printing the index print can be inputted from the external equipment such as the personal computer with the image data, which will be used for forming the thumbnail images. Alternatively, the instruction for printing the index print can be inputted with operation the operation device 4, and the image data, which will be used for forming the thumbnail images, are inputted from the recording medium 20 connected to the connector 12. Hereupon, the image data is a wide concept including full pixel image data which are obtained by an imaging device of the digital still camera and pixel skipped image data used for displaying the image on a monitor display or used directly for printing the thumbnail image on a paper sheet.

In the latter case, all the image data memorized in the recording medium 20 are subject to the thumbnail images printed on the index print. Since the instruction for printing the index print can be inputted through the operation device 4 and the image data used for forming the thumbnail images can be obtained from the recording medium 20 such as the memory card directly connected to the connector 12, it is possible to dispense with the use of the external equipment such as the personal computer, so that the operationality of the printer 1 can be improved.

When the instruction for printing the index image is inputted, the controller 2 takes the image data used for forming the thumbnail images (S11). When the instruction is inputted from the external equipment, the image data receiver 3 takes the image data inputted from the external equipment through the input/output interface 14 as the image data to be used for forming the thumbnail images. Alternatively, when the instruction is inputted from the operation device 4, the image data receiver 3 takes all the image data recorded in the recording medium 20 through the connector 12 and the data reader 13. The image data receiver 3 further transmits the image data to the controller 2.

The controller 2 counts a number of the images, which are to be printed as the thumbnail images on the index print(s), based on the image data (S12). Subsequently, the controller 2 calculates a minimum number of the paper sheets necessary for printing the index prints (S13). In the step S13, the controller 2 assumes that the index prints are printed with using the template having the largest number of the boxes (for example, the template having twenty-five boxes illustrated in FIG. 2E in this embodiment), and calculates the minimum number of the paper sheets necessary for printing all the thumbnail images. Specifically, the number of total images counted in the step S12 is divided by the largest number of the boxes of the templates, and an integer a calculated value, which is rounded a value after the decimal point, is decided as the minimum number of the paper sheets necessary for printing the index prints.

When the minimum number of the paper sheets is calculated, the controller 2 further calculates a number of the thumbnail images as per one paper sheet (S14). Specifically, the number of total images counted in the step S12 is divided by the minimum number of the paper sheet calculated in the step S13, and a calculated value is decided as the number of the thumbnail images printed on the same paper sheet. The calculated value is not necessarily rounded, at this time.

Subsequently, the controller 2 selects the most suitable template among the templates memorized in the template memory 11 corresponding to the number of the thumbnail images printed on the same paper sheet in the step S14 (S15). In the step S15, a template having the smallest number of the boxes is selected among the templates having the number of the boxes larger than the number of the thumbnail images printed on the same paper sheet. When the most suitable template is selected, the controller 2 executes actual printing of the index print on the paper sheets following to the printing format specified in the selected template (S16), and completes this process.

As mentioned above, the printer 1 automatically selects the most suitable template when one or more index prints are printed so that the number of paper sheets becomes the smallest but the frame size of the thumbnail images becomes the largest. Thus, the user can be removed the burden of the judgment and the selection of the suitable template, so that the operation of the conventional printer becomes tractable. Furthermore, one or more index prints can be obtained without using the external equipment such as the personal computer.

It is further possible to input a requirement for printing individual images recorded in the recording medium 20 connected to the connector 12 on individual paper sheets. Specifically, the user can operate operation keys of the operation device 4 corresponding to the requirement of the printing of the individual images and the instruction of the number of the images to be printed. Serial numbers of the images are printed on the index print associating with the thumbnail images. Thus, the user can input the serial numbers of the images to be printed with confirming the thumbnail images on the index print. The controller 2 takes the image data having the inputted serial numbers from the recording medium 20 through the data reader 13 and the image data receiver 3, and executes predetermined processing with respect to the image data. The printing mechanism 5 prints the individual images having the serial numbers selected by the user on the individual paper sheets with using the image data. When each image data includes information of the frame size such as the E-frame or the panorama frame, the printing mechanism 5 prepares a paper sheet corresponding to the information of the frame size. Thus, the individual images can be printed on the individual paper sheets having the proper frame size corresponding to the frame size of the images. As a result, the user can obtain the individual images recorded in the recording medium 20 without using the external equipment such as the personal computer. It is needless to say that the request for printing the individual images can be inputted from the external equipment.

Figure 5:
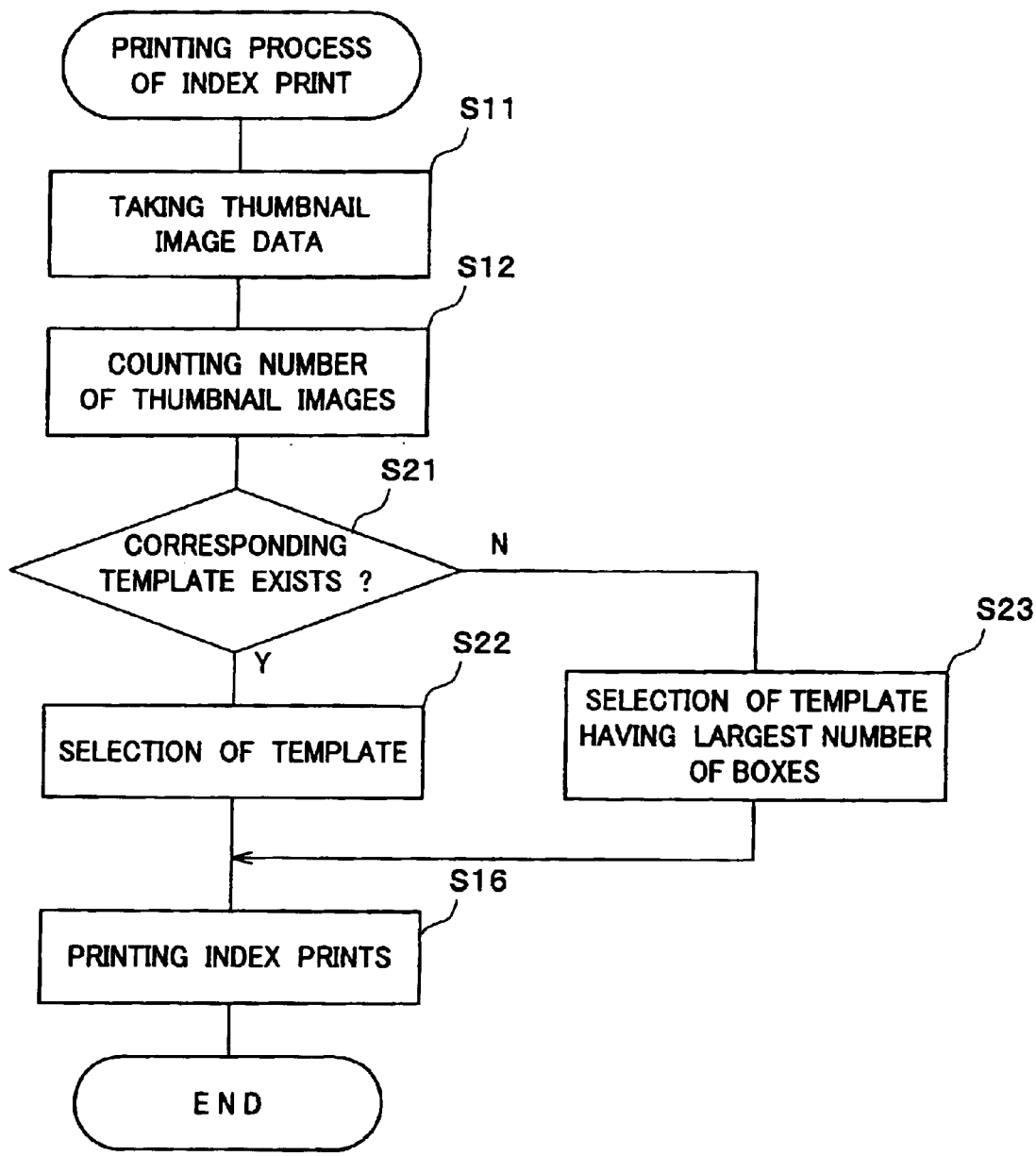
FIG. 5 is a flowchart showing another example of a process for printing an index print in the printer.

A modification of the printing process of the index print is described with reference to a flowchart shown in FIG. 5. In the flow illustrated in FIG. 5, the same steps as those in the flow illustrated in FIG. 4 are designated by the same numerals.

After executing the processes in the steps S11 and S12, the controller 2 judges whether at least one template having a number of boxes larger than the number of the thumbnail images printed as one or more index prints exists or not (S21). When it is judged the corresponding template exists, the controller 2 further selects one template having the smallest number of the boxes among at least one of the template having a number of boxes larger than the number of the thumbnail images printed on each index print (S22). On the other hand, when it is judged no corresponding template exists, the controller 2 selects the template having the largest number of the boxes (S23). After selecting the template in the step S22 or S23, the controller 2 executes actual printing of one or more index prints on the paper sheets following to the printing format specified in the selected template (S16), and completes this process.

According to this modification, the printer 1 can automatically select the template by which the number of the paper sheets necessary for printing one or more index prints can be made the smallest. When a plurality of the paper sheets is necessary for printing the index prints, the frame size of the boxes in which the thumbnail images are printed could have not been the largest. It, however, is possible to make the process for selecting the template simple and to make the term necessary for printing the index prints shorter.

In the above-mentioned embodiment, the recording medium 20 such as a memory card is connected to the connector 12, and the image data is taken from the recording medium 20 through the connector 12, the data reader 13 and the image data receiver 3. It, however, is possible to take the image data from a digital still camera through the input/output interface 14 and the image data receiver 3, when the digital still camera is directly connected to the input/output interface 14.

Furthermore, in the above-mentioned embodiment, the thumbnail images are formed by pixel slipping of the image data, which can be used for printing the individual image. It, however, is possible to use the thumbnail image data attached with the image data of the individual image for printing the index prints.

This application is based on Japanese patent application 2003-275763 filed Jul. 17, 2003 in Japan, the contents of which are hereby incorporated by references.

Although the present invention has been fully described by way of example with reference to the accompanying drawings, it is to be understood that various changes and modifications will be apparent to those skilled in the art. Therefore, unless otherwise such changes and modifications depart from the scope of the present invention, they should be construed as being included therein.

What is claimed is:

1. A printer comprising:
   a template memory for memorizing a plurality of kinds of templates respectively specifying a number, a size and an arrangement of boxes on each paper sheet in which thumbnail images are printed;
   an image data receiver for receiving image data;
   a controller for selecting a template suitable for printing one or more index prints among the templates memorized in the template memory; and
   a printing mechanism for printing one or more index prints following a printing format specified in the selected template; and wherein
   the controller calculates a minimum number of the paper sheets necessary for printing the index prints corresponding to the numbers of the boxes of the templates and a number of thumbnail images to be printed as the index prints, and selects one template having the largest size of the boxes among the templates by which all the thumbnail images can be arranged on the minimum number of the paper sheets.

2. The printer in accordance with claim 1, wherein the controller divides the number of the thumbnail images by a largest number of the boxes of the templates, rounds a value after the decimal point for making the minimum number of the paper sheets as an integer, further divides the number of the thumbnail images by the minimum number of the paper sheets, and selects a template having the smallest number of the boxes among the templates having the number of the boxes larger than the divided number of the thumbnail images by the minimum number of the paper sheets.

3. The printer in accordance with claim 1, further comprising: a connector to which a recording medium can be connected; and a data reader for reading image data from the recording medium; and wherein the image data receiver takes all the image data recorded in the recording medium; and the controller forms thumbnail images with using the image data taken by the image data receiver.

4. The printer in accordance with claim 1, wherein the controller judges whether at least one template having a number of boxes larger than the number of the thumbnail images printed as the index prints exists or not, selects one template having the smallest number of the boxes among at least one of the template having a number of boxes larger than the number of the thumbnail images printed on each index print when it is judged the corresponding template exists, the controller 2, and selects the template having the largest number of the boxes when it is judged no corresponding template exists.

5. The printer in accordance with claim 1, further comprising an operation device through which an instruction for printing the index prints can be inputted.

6. A printer having a function for printing one or more index prints comprising:

a connector to which a recording medium can be connected;

a data reader for reading data from the recording medium through the connector;

an input/output interface by which an external equipment can be connected;

an image data receiver for taking image data from the recording medium through the connector and the data reader or from the external equipment through the input/output interface;

an operation device by which an instruction for printing the index print can be inputted;

a template memory for memorizing a plurality of kinds of templates respectively specifying a number, a size and an arrangement of boxes on each paper sheet in which thumbnail images are printed;

a controller for selecting a template suitable for printing one or more index prints among the templates memorized in the template memory; and a printing mechanism for printing one or more index prints following a printing format specified in the selected template; and wherein when the instruction for printing the index print is inputted from the operation device, the image data receiver serially takes image data from the recording medium or the external equipment, and the controller forms thumbnail image data by pixel skipping the image data;

when all the thumbnail image data are formed, the controller counts a number of thumbnail images to be printed as the index print, divides the number of the thumbnail images by a largest number of the boxes of the templates, rounds a value after the decimal point for making the minimum number of the paper sheets as an integer, further divides the number of the thumbnail images by the minimum number of the paper sheets, and selects a template having the smallest number of the boxes among the templates having the number of the boxes larger than the divided number of the thumbnail images by the minimum number of the paper sheets;

when the template is selected, the controller prepares one or more printing data by allocating the thumbnail image data at positions of the boxes following to the printing format of the selected template; and the printing mechanism prints one or more index prints on paper sheets with using the printing data.

7. A printer comprising:

a memory means for memorizing a plurality of kinds of templates respectively specifying a number, a size and an arrangement of boxes on each paper sheet in which thumbnail images are printed;

an image data receiving means for receiving image data;

a calculating means for calculating a minimum number of the paper sheets necessary for printing the index prints corresponding to the numbers of the boxes of the templates and a number of thumbnail images to be printed as the index prints, a template selecting means for selecting a template suitable having the largest size of the boxes among the templates memorized in the template memory, by which all the thumbnail images can be arranged on the minimum number of the paper sheets for printing one or more index prints; and a printing means for printing one or more index prints following a printing format specified in the selected template.

* * * * *